US006351800B1

(12) United States Patent
Martin et al.

(10) Patent No.: US 6,351,800 B1

(45) Date of Patent: Feb. 26, 2002

(54) SYSTEM AND METHOD FOR ASSISTING A MICROPROCESSOR

(75) Inventors: Steve Craig Martin, Naperville, IL (US); Kenneth Nicholas Schaff, Cumming, GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/201,312

(22) Filed: Nov. 29, 1998

(51) Int. Cl.[7] .................................................. G06F 9/22

(52) U.S. Cl. ........................................................ 712/36

(58) Field of Search .............................. 712/36, 32, 34, 712/35; 704/201, 203

(56) References Cited

U.S. PATENT DOCUMENTS

| | | | | | |
|---|---|---|---|---|---|
| 5,592,556 | A | * | 1/1997 | Schnerd | 380/274 |
| 5,606,714 | A | * | 2/1997 | Intrater et al. | 712/43 |
| 5,630,153 | A | * | 5/1997 | Intrater et al. | 712/35 |
| 5,778,024 | A | * | 7/1998 | McDonough | 375/216 |
| 5,784,532 | A | * | 7/1998 | McDonough et al. | 704/224 |
| 6,002,999 | A | * | 12/1999 | Han et al. | 704/201 |
| 6,006,189 | A | * | 12/1999 | Strawczynski et al. | 704/270 |
| 6,125,110 | A | * | 9/2000 | Proctor et al. | 370/331 |

* cited by examiner

*Primary Examiner*—William M. Treat

(57) ABSTRACT

A system and method for assisting a microprocessor process data packets with an assist circuit that has programmable microcode that is externally located from the assist circuit and is programmable by the microprocessor.

27 Claims, 3 Drawing Sheets

SYSTEM AND METHOD FOR ASSISTING A MICROPROCESSOR

BACKGROUND OF THE INVENTION

The present invention relates generally to the field of communication systems and more particularly to telecommunication systems.

As telecommunication systems continue to expand services, an emphasis is to provide greater communication data (such as voice and digital data) throughput. The need for greater communication data throughput is expected to increase substantially as more telecommunication services such as digital data transmission, facsimile, call features, and video transmission are added by subscribers. This produces a need for faster switching circuits that support greater data throughput.

Presently, switching circuits such as protocol handler voice (PHV) circuits are limited in speed by the activities performed by the PHV circuit's core processor. Future PHV circuit packs are planned to support greater than 32 code division multiple access (CDMA) voice channels. However, based on the typical performance of current PHV circuits (such as the Lucent Technologies Inc. PHV3 circuit pack), the core processor (a Motorola Inc. MC68060 microprocessor) of these PHVs will not have enough real time to respond to the voice encoders' (vocoders) interrupts.

Additionally, modern vocoders are programmable, thus allowing them to execute various algorithms as required by the switching circuit's core processor such as CDMA, enhanced variable rate coding (EVRC), time division multiple access (TDMA), code excited linear prediction (CLEP), etc. There is currently no standard interface defined for vocoders using these algorithms. Thus, a need exists for a programmable solution to increase the speed and throughput of telecommunication switching circuits that interface with various types of vocoders.

SUMMARY OF THE INVENTION

In accordance with the present invention, the problem of increasing the speed and throughput of telecommunication switching circuits that interface with various types of vocoders is overcome by using an hardware assist circuit that has programmable microcode located in an external memory unit.

An example system of the invention includes an assist circuit for assisting the microprocessor, of the switching circuit, process data and a control memory unit containing programmable microcode. The assist circuit is usually an application specific integrated circuit.

Additionally, a dual port memory unit is placed between the assist circuit and the microprocessor to allow both to transfer data back and forth.

BRIEF DESCRIPTION OF THE DRAWINGS

The foregoing advantageous features of the invention will be described in detail and other advantageous features will be made apparent upon reading the following detailed description that is given with reference to the several figures of the drawings, in which.

DETAILED DESCRIPTION

Figure 1:
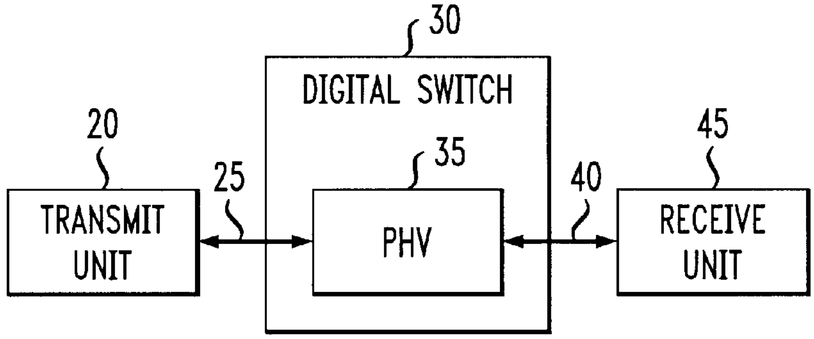
FIG. 1 PRIOR ART
FIG. 1 is a functional block diagram of a prior art telecommunication system.

Referring to FIG. 1, an existing telecommunication system is shown. A transmit unit 20 sends and receives communication data (such as voice, digital data, and facsimile) to a receive unit 45 through a protocol handler voice circuit (PHV) 35 located inside a digital switch 30. The system allows two way communication between the transmit unit 20 and the receive unit 45 by working identically in both directions. In one direction, the transmit unit 20 sends communication data via an input signal 25 to the PHV 35 and digital switch 30 which processes and routes the data via an output signal 40 to the receive unit 45. In the other direction, the receive unit 45 sends communication data via the output signal 40 to the PHV 35 and digital switch 30 which processes and routes the data via the input signal 25 to a transmit unit 20.

The transmit unit 20 and receive unit 45 are either mobile terminals (also known as mobile stations), such as cellular telephones or radio units, or non-mobile terminals such as conventional land-line telephones. Examples of the digital switch 30 and PHV 35 are the Lucent Technologies Inc. 5ESS digital switch and PHV3.

Figure 2:
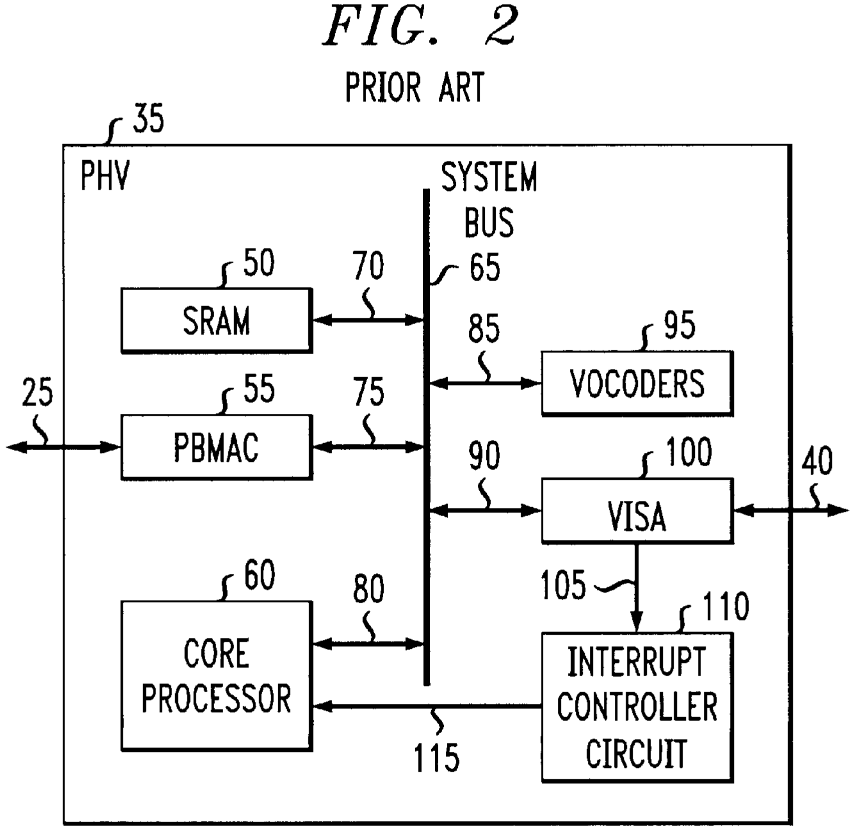
FIG. 2 PRIOR ART
FIG. 2 is another functional block diagram showing a prior art protocol handler voice function block of FIG. 1.

FIG. 2 is a prior art functional block diagram for the PHV 35 of FIG. 1. The PHV 35 is shown to have numerous functional blocks within it. The PHV 35 contains a microprocessor (core processor) 60, a packet bus media access controller (PBMAC) 55, a static random access memory (SRAM) 50, a system bus 65, a number of voice encoders (vocoders) 95, a vocoder interrupt and serial access circuit (VISA) 100, and an interrupt controller circuit 110.

The system bus 65 connects all the sub components of the PHV 35. The PBMAC 55 controls the input and output of data into and out of the PHV 35 to the digital switch 30 of FIG. 1. The core processor 60 is a high speed microprocessor that controls the operation of the PHV 35. An example of the core processor 60 is a Motorola Inc. MC68060 microprocessor.

The vocoders 95 consist of digital signal processors (DSP's) that include both speech analyzers and speech synthesizers. The analyzer circuits convert analog speech waveforms into digital signals. The synthesizers convert the digital signals into compressed speech filter coefficients organized into voice packets. The VISA 100 generates transmit and receive interrupt signals (interrupts) to synchronize the core processor 60 and the system bus 65 for proper data flow to and from the vocoders' 95 DSP's to the system bus 65. The VISA 100 generates a large number of interrupts that would slow down the core processor 60 if it were required to respond to all of the VISA's 100 interrupts. Thus, the interrupt controller circuit 110 manages the interrupts directed to the core processor 60 by the VISA 100 and sends the resulting managed interrupts to the core processor 60.

As an example, in FIG. 2, when the transmit unit 20 of FIG. 1 sends a voice data packet via the input signal 25 to the digital switch 30 of FIG. 1, the digital switch 30 sends the input signal 25 to the PBMAC 55 in the PHV 35. The voice data packet is then passed via connection 75 from the PBMAC 55 to the system bus 65 which is further passed to the SRAM 50 by the core processor 60 via connection 80 and 70. The core processor 60 then determines what type of processing is needed to handle the voice data packet and forwards the voice data packet to the vocoders 95 via the system bus 65, the SRAM 50, and connections 80, 70, 85, and 90. The vocoders 95 then process the voice data packet based on the needs of the core processor 60. The uncompressed voice from the vocoders 95 is then forwarded to the VISA 100 for channelization into a serial timeslot data stream and then generates the output signal 40 which is sent to the receive unit 45 of FIG. 1.

The synchronization of moving the voice data packets through the PHV 35 is controlled by the VISA 100. The VISA 100 sends transmit and receive interrupts to the system bus 65 via connection 90, the vocoders 95, the SRAM 70, and the core processor 60. These transmit and receive interrupts ensure that the voice data packets moves through the PHV 35 at the proper time to meet the real time needs of voice communication. However, the VISA 100 produces a large number of interrupt signals that the core processor 60 cannot manage simultaneously without slowing down the core processor's 60 performance. Thus, the interrupt controller circuit 110 is used to manage the numerous interrupts input via connection 105 from the VISA 100 and inputs only the necessary ones to the core processor 60 via connection 115.

Communication in the opposite direction from the receive unit 45 of FIG. 1 to the transmit unit 20 of FIG. 1 is identical because the digital switch 30 of FIG. 1 is a complete two-way communication system.

Figure 3:
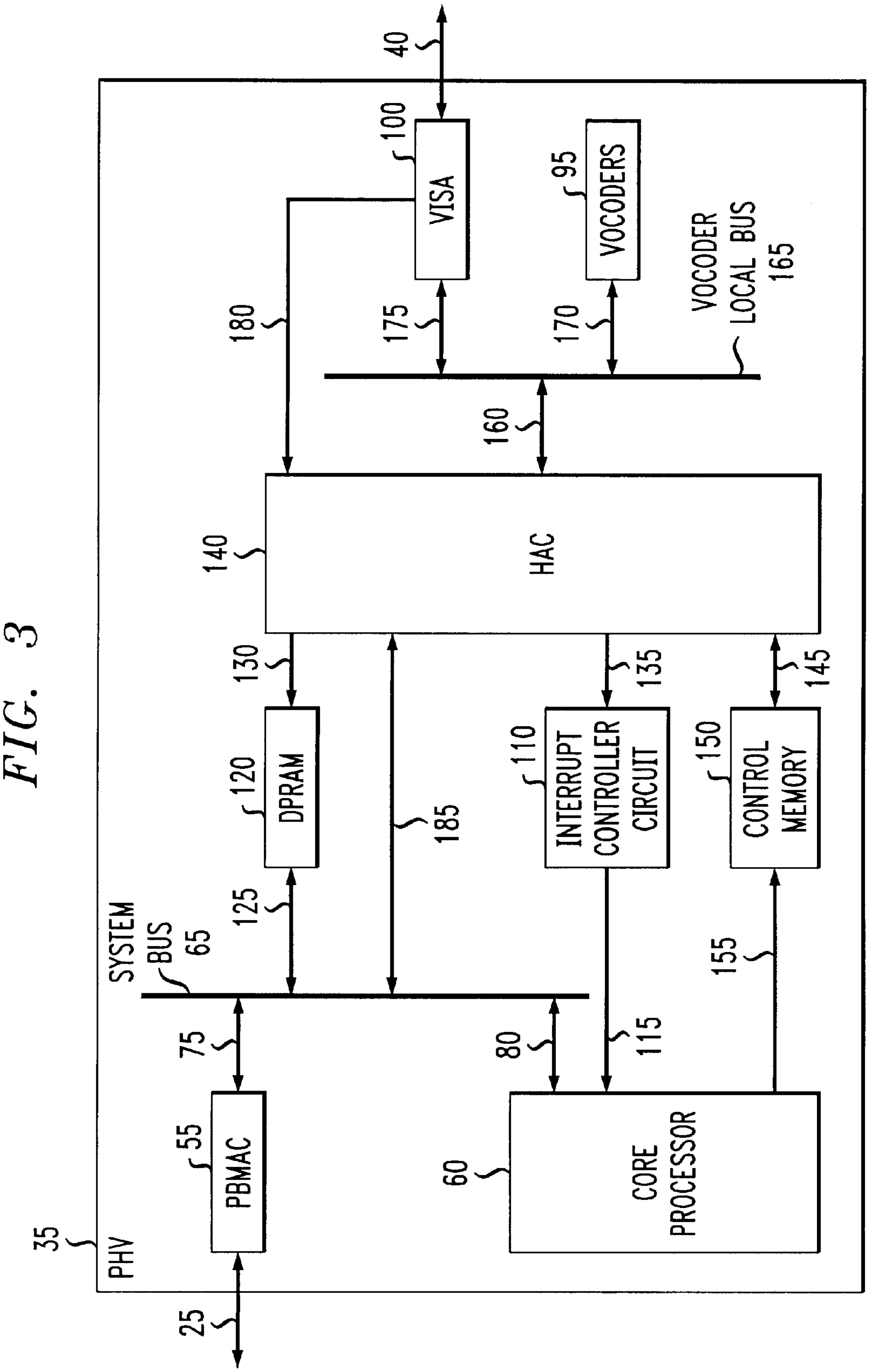
FIG. 3 is a function block diagram of the system of the invention within the protocol handler voice function block of FIG. 1.

FIG. 3 shows a functional block diagram of the PHV 35 incorporating the invention. The PHV 35 is shown to have numerous functional blocks within it. The PHV 35 contains a core processor 60, a PBMAC 55, a dual port random access memory (DPRAM) 120, a system bus 65, a number of vocoders 95, a VISA 100, an interrupt controller circuit 110, a vocoder local bus 165, a control memory 150, and a hardware assist circuit (HAC) 140.

The system bus 65 allows data to be transferred back and forth between the PBMAC 55, core processor 60, DPRAM 120, and HAC 140. The system bus 65 connects to the HAC 140 via connection 185, the DPRAM 120 via connection 125, the PBMAC 55 via connection 75 and the core processor 60 via connection 80. There is also second bus, the vocoder local bus 165, that connects to the vocoders 95 via connection 170, the VISA 100 via connection 175, and the HAC 140 via connection 160. The vocoder local bus 165 allows data to be transferred back and forth between the vocoders 95, VISA 100, and HAC 140.

The PBMAC 55 controls the input and output of data into and out of the PHV 35 to the digital switch 30 of FIG. 1. The core processor 60 is a high speed microprocessor that controls the operation of the PHV 35. As in FIG. 2, an example of the core processor 60 is a Motorola Inc. MC68060 microprocessor.

The primary function of the HAC 140 is to perform data transfers between the core processor 60 and vocoders 95. The vocoders 95 consist of DSP's that include both speech analyzers and speech synthesizers and are programmable allowing them to execute various algorithms (such as CDMA, EVRC, and TDMA) as desired by the core processor 60.

There is currently no standard interface protocol defined for vocoders 95 using these algorithms, thus the HAC 140 is designed to provide a programmable method to perform the data transfers with the different algorithms. Since the vocoders 95 are programmable, the vocoders 95 are able to execute various coding algorithms. The different algorithms will require different vocoder 95 commands and interface timing requirements for each application. To support the programmable vocoders 95, the HAC 140 interface to them is also programmable.

The HAC 140 executes microcode commands located in the control memory 150 to interface with the vocoders 95. The vocoder 95 interface commands and their parameters are stored as microcode in the control memory 150. When either an interrupt or core processor 60 request is received, the HAC 140 will vector into the control memory 150 to execute the stored microcode commands. These microcode commands are pre-programmed by the core processor 60 and can be changed as necessary to support the desired vocoder 95 algorithm command and response requirements. The microcode is programmable by the core processor 60 via connection 155.

Microcode is usually a set of programmed instructions that are typically unalterable based on the hardware architecture of a circuit. However, because the control memory 150 is a random access memory that is external to the HAC 140 it is programmable in this configuration. The microcode comprises a variety of information such as the timing parameters for the timing of input and output cycles of the HAC 140, the algorithm parameters for the vocoders 95 and routing parameters for selecting the best data pass through the inside the HAC 140. Since the microcode is programmable by the core processor 60, the vocoder 95 interface is flexible.

The HAC 140 is responsible for moving voice data packets in and out of the various vocoders 95 on the PHV 35 without requiring intervention of the core processor 60. The voice packet data is stored in the DPRAM 120 that is accessible by either the HAC 140 or the core processor 60. Voice data packets received from input signal 25 are written to the DPRAM 120 by the core processor 60 and are forwarded to the appropriate vocoder 95 by the HAC 140. Voice data packets going to output signal 40 are read from the vocoder 95 by the HAC 140 and are stored into the DPRAM 120 so that the core processor 60 may access them. The movement of data to and from the vocoders 95 is synchronized by the VISA 100. The VISA 100 is capable of generating interrupts that are used to notify the HAC 140 when a vocoder 95 channel is in ready to receive or transmit data.

As an example, when the transmit unit 20 of FIG. 1 sends voice data packet via the input signal 25 to the digital switch 30 of FIG. 1, the digital switch 30 sends the input signal 25 to the PBMAC 55 in the PHV 35. The voice data packet is then passed via connection 75 from the PBMAC 55 to the system bus 65 which is passed to the core processor 60 via connection 80. The core processor 60 then determines what type of processing is needed to handle the voice data packet and forwards the voice data packet to the vocoders 95 via the system bus 65, the DPRAM 120, the HAC 140, the vocoder local bus 165, and connections 80, 125, 130, 160, and 170. The vocoders 95 then process the voice data packet based on the needs of the core processor 60. The uncompressed voice from the vocoders 95 is then forwarded to the VISA 100 for channelization into a serial timeslot data stream and then generates the output signal 40 which is input to the receive unit 45 of FIG. 1.

The synchronization of the moving the voice data packet through the PHV 35 is controlled by the VISA 100. The VISA 100 sends transmit and receive interrupt signals to the system bus 65 via connection 90, the vocoders 95, the HAC 140 via connection 180, and the core processor 60. These transmit and receive interrupts ensure that the voice data packets move through the PHV 35 without interfering with other data generated by the system. The interrupt controller circuit 110 then manages the numerous interrupts input via connection 135 from the VISA 100 and inputs only the necessary ones to the core processor 60 via connection 115.

Communication in the opposite direction from the receive unit 45 of FIG. 1 to the transmit unit 20 of FIG. 1 is identical because the digital switch 30 of FIG. 1 is a complete two way communication system.

Figure 4:
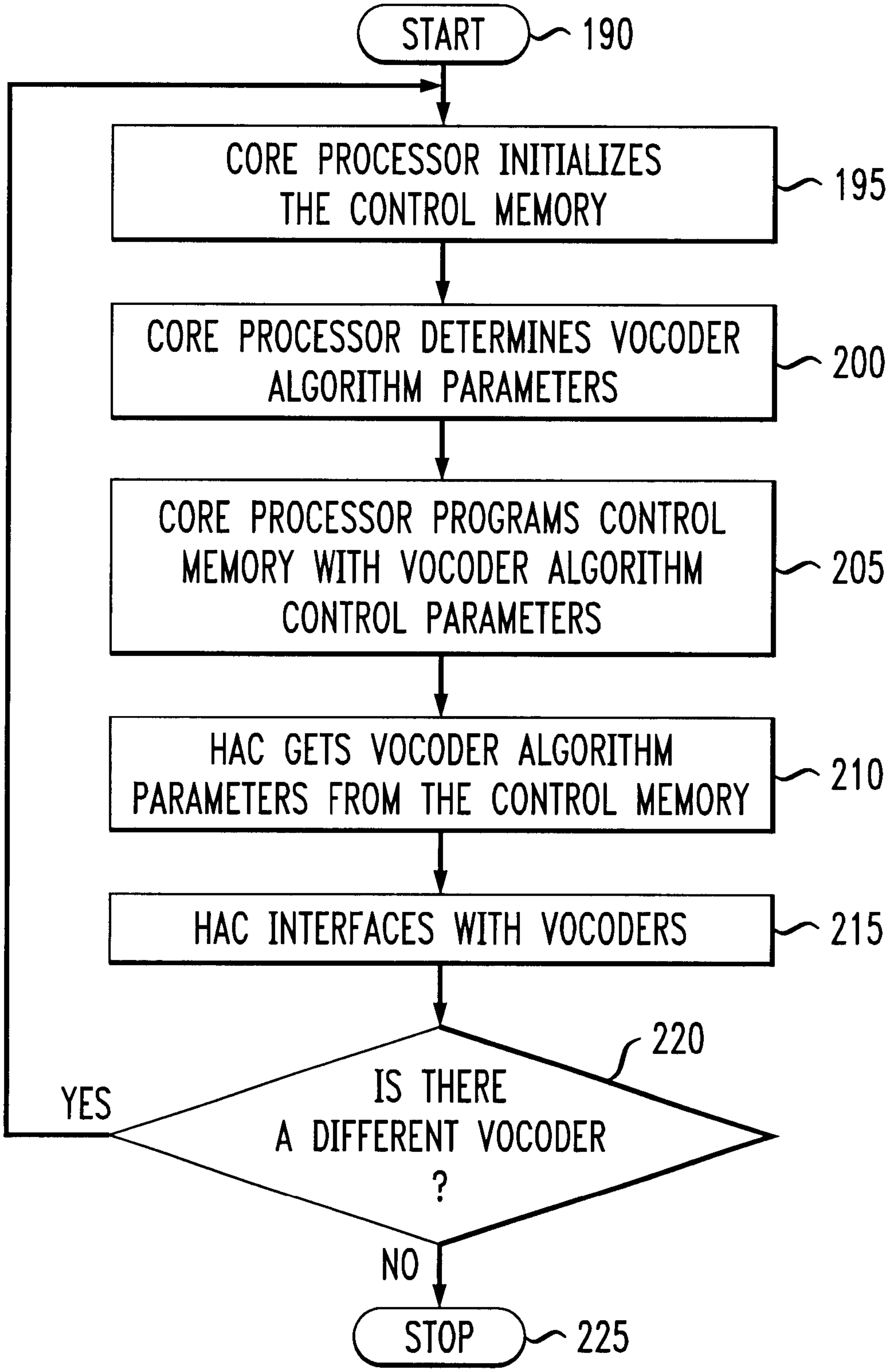
FIG. 4 is a logical flow chart showing the method used in programming the hardware assist circuit of FIG. 3.

In FIG. 4, a logic flow chart shows the preferred process steps preformed by the system of FIG. 3. In process starts at 190. In step 195, the core processor 60 initializes the control memory 150, which clears any old values and prepares the control memory 150 for the new microcode commands. The core processor 60 then determines the required vocoder 95 algorithm parameters to interface the HAC 140 to the vocoders 95 in step 200. In step 205, the core processor 60 programs the control memory 150 with the required vocoder 95 algorithm parameters to interface the HAC 140 to the vocoders 95. The HAC 140 then pulls the microcode containing the vocoder 95 algorithm parameters from the control memory 150 in step 210. In step 215, the HAC 140 interfaces with the vocoders 95 and beings to process data.

In decision step 220, the core processor 60 checks to see if there is a need to change the vocoder 95 parameters. If the answer to decision step 220 is yes, the process continues back to step 195 and the process is repeated. If instead the answer is no, the process ends at step 225.

Please note that while the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope. The scope of the invention is indicated by the attached claims.

What is claimed is:

1. A system for assisting a microprocessor, the system comprising:

an assist circuit for assisting the microprocessor in processing data from any of a plurality of types of vocoders; and a control memory containing control data for the assist circuit;

wherein the system further comprises a dual port memory unit connected between the microprocessor and the assist circuit.

2. The system as recited in claim 1 wherein the dual port memory is high speed memory.

3. A system for assisting a microprocessor, the system comprising:

an assist circuit for assisting the microprocessor in processing data; and a control memory containing control data for the assist circuit;

wherein the system further comprises a dual port memory unit connected between the microprocessor and the assist circuit;

wherein the assist circuit assists the microprocessor in processing data from at least one of a plurality of vocoders.

4. A system for assisting a microprocessor, the system comprising:

an assist circuit for assisting the microprocessor in processing data; and a control memory containing control data for the assist circuit;

wherein the system further comprises a dual port memory unit connected between the microprocessor and the assist circuit;

wherein the dual port memory holds vocoder data for the microprocessor obtained by the assist circuit from at least one of a plurality of vocoders.

5. A system for assisting a microprocessor, the system comprising:

an assist circuit for assisting the microprocessor in processing data; and a control memory containing control data for the assist circuit;

wherein the system further comprises a dual port memory unit connected between the microprocessor and the assist circuit;

wherein the assist circuit processes vocoder data from at least one of a plurality of vocoders and places the processed vocoder data into the dual port memory unit for the microprocessor.

6. A system for assisting a microprocessor, the system comprising:

an assist circuit for assisting the microprocessor in processing data; and a control memory containing control data for the assist circuit;

wherein the system further comprises a dual port memory unit connected between the microprocessor and the assist circuit;

wherein the dual port memory is high speed memory;

wherein the assist circuit assists the microprocessor in processing data from at least one of a plurality of vocoders.

7. A system for assisting a microprocessor, the system comprising:

an assist circuit for assisting the microprocessor in processing data from any of a plurality of types of vocoders; and a control memory containing control data for the assist circuit;

wherein the control memory holds microcode for the assist circuit.

8. The system as recited in claim 7 wherein the microcode is configurable.

9. The system as recited in claim 7 wherein the microcode is configurable by the microprocessor.

10. A system for assisting a microprocessor, the system comprising:

an assist circuit for assisting the microprocessor in processing data; and a control memory containing control data for the assist circuit;

wherein the control memory holds microcode for the assist circuit;

wherein the microcode contains a set of parameters to change an interface protocol for communication between the assist circuit and at least one of a plurality of vocoders.

11. A system for assisting a microprocessor, the system comprising:

an assist circuit for assisting the microprocessor in processing data; and a control memory containing control data for the assist circuit;

wherein the control memory holds microcode for the assist circuit;

wherein the microcode comprises:

a plurality of timing parameters for timing the input and output cycles of the assist circuit;

a plurality of algorithm parameters for choosing one of a plurality of algorithms for at least one of a plurality of vocoders; and a plurality of routing parameters for selecting a data pass inside the assist circuit.

12. A system for assisting a microprocessor, the system comprising:

means for assisting the microprocessor in processing data from any of a plurality of types of vocoders;

a control memory containing control data for the means for assisting the microprocessor; and means for controlling the control memory;

wherein the system further comprises a dual port memory unit connected between the microprocessor and the means for assisting the microprocessor.

13. The system as recited in claim 12 wherein the dual port memory is high speed memory.

14. A system for assisting a microprocessor, the system comprising:

means for assisting the microprocessor in processing data;

a control memory containing control data for the means for assisting the microprocessor; and means for controlling the control memory;

wherein the system further comprises a dual port memory unit connected between the microprocessor and the means for assisting the microprocessor;

wherein the means for assisting the microprocessor assists the microprocessor in processing data from at least one of a plurality of vocoders.

15. A system for assisting a microprocessor, the system comprising:

means for assisting the microprocessor in processing data;

a control memory containing control data for the means for assisting the microprocessor; and means for controlling the control memory;

wherein the system further comprises a dual port memory unit connected between the microprocessor and the means for assisting the microprocessor;

wherein the dual port memory holds vocoder data for the microprocessor obtained by the means for assisting the microprocessor from at least one of a plurality of vocoders.

16. A system for assisting a microprocessor, the system comprising:

means for assisting the microprocessor in processing data;

a control memory containing control data for the means for assisting the microprocessor; and means for controlling the control memory;

wherein the system further comprises a dual port memory unit connected between the microprocessor and the means for assisting the microprocessor;

wherein the means for assisting the microprocessor processes vocoder data from at least one of a plurality of vocoders and places the processed vocoder data into the dual port memory unit for the microprocessor.

17. A system for assisting a microprocessor, the system comprising:

means for assisting the microprocessor in processing data from any of a plurality of types of vocoders;

a control memory containing control data for the means for assisting the microprocessor; and means for controlling the control memory;

wherein the control memory holds microcode for the means for assisting the microprocessor.

18. The system as recited in claim 17 wherein the microcode is configurable.

19. The system as recited in claim 17 wherein the microcode is configurable by the microprocessor.

20. A system for assisting a microprocessor, the system comprising:

means for assisting the microprocessor in processing data;

a control memory containing control data for the means for assisting the microprocessor; and means for controlling the control memory;

wherein the control memory holds microcode for the means for assisting the microprocessor;

wherein the microcode contains parameters to change an interface protocol for communication between the means for assisting the microprocessor and at least one of a plurality of vocoders.

21. A system for assisting a microprocessor, the system comprising:

means for assisting the microprocessor in processing data;

a control memory containing control data for the means for assisting the microprocessor; and means for controlling the control memory;

wherein the control memory holds microcode for the means for assisting the microprocessor;

wherein the microcode comprises:

a plurality of timing parameters for timing the input and output cycles of the means for assisting the microprocessor;

a plurality of algorithm parameters for choosing one of a plurality of algorithms for at least one of a plurality of vocoders; and a plurality of routing parameters for selecting data passes inside the means for assisting the microprocessor.

22. A method for assisting the processing of a microprocessor, the method comprising the steps of:

establishing control data in a control memory;

assisting the microprocessor in processing data, from any of a plurality of types of vocoders, based on the control data in the control memory;

wherein the step of assisting the microprocessor in processing data is performed by an application specific integrated circuit;

wherein the control data is microcode for the application specific integrated circuit.

23. The method as recited in claim 22, wherein the method further comprises the step of configuring the microcode.

24. The method as recited in claim 22, wherein the method further comprises the step of configuring the microcode with the microprocessor.

25. A method for assisting the processing of a microprocessor, the method comprising the steps of:

establishing control data in a control memory;

assisting the microprocessor in processing data based on the control data in the control memory;

wherein the step of assisting the microprocessor in processing data is performed by an application specific integrated circuit;

wherein the control data is microcode for the application specific integrated circuit;

wherein the microcode contains parameters to change an interface protocol for communication between the application specific integrated circuit and at least one of a plurality of vocoders.

26. A method for assisting the processing of a microprocessor, the method comprising the steps of:

establishing control data in a control memory;

assisting the microprocessor in processing data based on the control data in the control memory;

wherein the step of assisting the microprocessor in processing data is performed by an application specific integrated circuit;

wherein the control data is microcode for the application specific integrated circuit;

wherein the method further comprises the steps of:

configuring the microcode with timing parameters for timing the input and output cycles of the application specific integrated circuit;

configuring the microcode with an algorithm parameter for choosing one of a plurality of algorithms for at least one of a plurality of vocoders; and configuring the microcode with a routing parameter for selecting a data pass inside the application specific integrated circuit.

27. A method for assisting the processing of a microprocessor, the method comprising the steps of:

establishing control data in a control memory;

assisting the microprocessor in processing data based on the control data in the control memory;

wherein the method further comprises the steps of:

processing vocoder data from at least one of a plurality of vocoders;

placing the processed vocoder data into a dual port memory for the microprocessor.

* * * * *